3,299,670
ENGAGEABLE AND DISENGAGEABLE TORQUE-TRANSMITTING CONNECTIONS
Ernest Needham Ailbeson, Sheffield, and Samuel Robert Skelton, Chapeltown, near Sheffield, England, assignors to The Brightside Foundry & Engineering Company Limited, Ecclesfield, Sheffield, England
Filed Aug. 27, 1964, Ser. No. 392,500
Claims priority, application Great Britain, Sept. 6, 1963, 35,315/63
2 Claims. (Cl. 64—8)

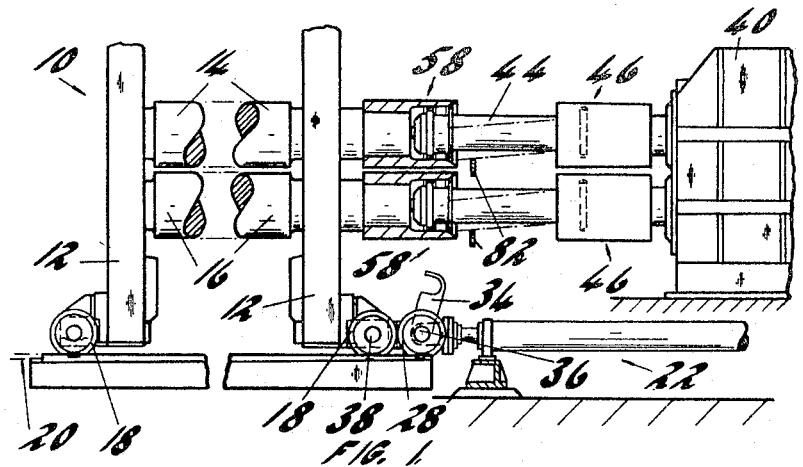
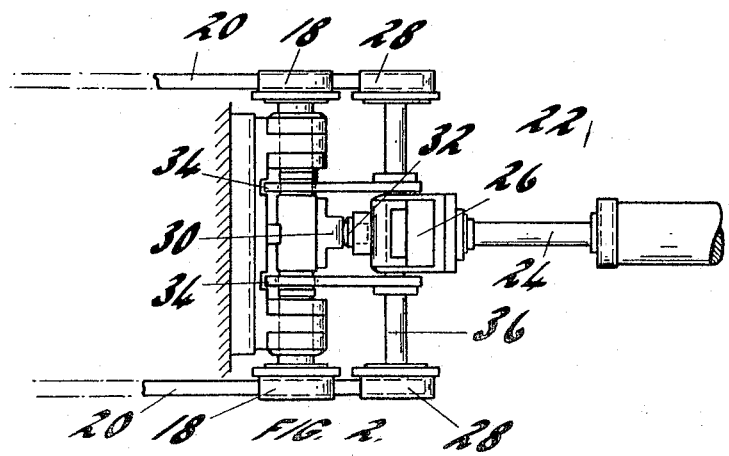
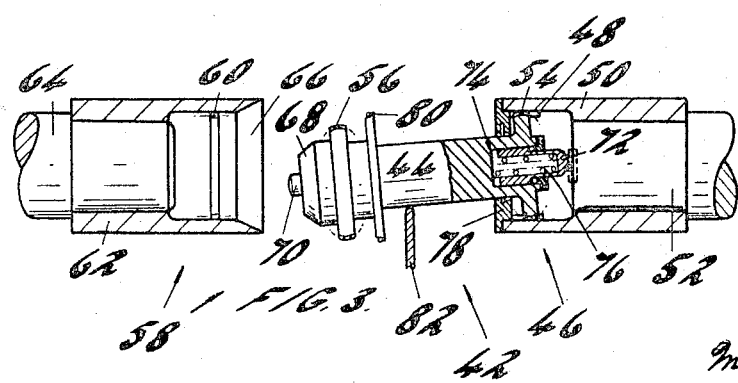

The invention relates to engageable and disengageable torque-transmitting connections for drivably coupling a rolling mill roll to a pinion for driving said roll, and has for its object to provide an improvement therein.

In particular, the invention is intended to provide a connection which will facilitate the exchanging of roll housings, and although various proposals have previously been made with this object in view they have generally suffered from the disadvantage that they have required the combined efforts of several men to effect the engagement of the connection. In addition, exchanging the roll housings with these prior proposals in use has been a very time-consuming operation.

According to the invention, there is provided an engageable and disengageable articulated torque-transmitting connection for drivably coupling a rolling mill roll to a pinion for driving said roll, said connection comprising a torque-transmitting shaft in permanent driving connection at one end with said pinion in a manner allowing articulation of said shaft, and having at its other end barrelled teeth which constitute the driving element of an engageable and disengageable gear-type articulable coupling, the driven element of which is constituted by an internal gear formed within a driving sleeve carried by the roll, said driving sleeve having a "bell-mouth" portion such that when said roll is moved axially to effect the engagement of the driving and driven elements of the coupling, said other end of the torque-transmitting shaft is caused to ride into the driving sleeve. Preferably, the permanent driving connection of the torque-transmitting shaft at its said one end with the pinion is constituted by a gear-type articulable coupling, the driving and driven elements of which are prevented from becoming disengaged by stop means, said driving and driven elements preferably being an internal gear formed within a driving sleeve and barrelled teeth formed on the shaft respectively, and said stop means preferably being constituted by a retaining ring secured to the sleeve. The torque-transmitting shaft preferably has a limited amount of axial freedom of movement relative to the last mentioned driving sleeve while retaining the driving and driven elements in engagement within said sleeve, and spring means are preferably provided for urging the torque-transmitting shaft outwardly of said sleeve, so that when the shaft is in driving engagement with the roll an end portion of said shaft is retained in abutment with the roll to maintain in engagement the driving and driven elements of the articulable coupling connecting the shaft and roll. Support means upon which the torque-transmitting shaft can fall when the roll is moved axially to effect the disengagement of the driving and driven elements of the engageable and disengageable articulable coupling are preferably also provided.

In order that the invention may be fully understood and readily put into effect, a preferred embodiment thereof will now be described, by way of example only, with reference to the accompanying drawings, of which:

FIG. 1 is a part-sectional elevation of a rolling mill embodying the invention,

FIG. 2 is a plan view which will hereinafter be referred to, and

FIG. 3 is a sectional view of an engageable and disengageable torque-transmitting connection embodied in the mill.

Referring now to the drawings, a rolling mill, generally indicated 10, has a roll housing 12 in which are journalled a pair of rolls 14 and 16, said housing being rigidly clamped down by means not shown when in its operative position as depicted in the drawings, but being provided with wheels 18 so that, when the clamping means are released, it can be displaced together with its rolls along rails 20, which extend in a direction parallel to the rolls. The means for moving the roll housing along the rails 20 include a double-acting hydraulic piston and cylinder assembly 22, a displaceable piston rod 24 one end of which is connected to a bogie 26 provided with a pair of wheels 28 which also ride upon the rails 20. A pair of abutment members 30 and 32 are provided on the housing 12 and bogie 26 respectively for transmitting movement to said housing in one direction, and a pair of latch members 34 for transmitting movement to the housing in the other direction are pivoted on an axle 36 of the bogie and are capable of being engaged with an axle 38 which connects two of the wheels 18 of said housing as shown in FIG. 2 of the drawings.

The arrangement so far described allows the entire rolling mill 10 to be replaced by a standby mill (not shown), for example when the rolls have become excessively worn or when the rolling program is being changed, thus reducing the "shut-down" period to a minimum. However, a problem which then presents itself is the difficulty of establishing simultaneous driving connections between the rolls of the standby mill and respective pinions (not shown) journalled in a pinion housing 40 for driving said rolls, bearing in mind that, although the center distance between the pinions is fixed, the center distance between the rolls of a standby mill will generally be different from the center distance between the rolls of a mill which it is replacing. It is with the solution of this problem that this invention is concerned.

Referring now in particular to FIG. 3, an engageable and disengageable articulated torque-transmitting connection for drivably coupling a roll to a pinion for driving said roll is generally indicated 42. The connection comprises a torque-transmitting shaft 44 which at one end is in permanent driving connection with a pinion (not shown) for driving a roll, said permanent connection being constituted by a gear-type articulable coupling 46, a driving element of which is constituted by a relatively wide internal gear 48 which is formed within a driving sleeve 50 carried by a shaft 52 driven by said pinion, and a driven element which is constituted by barrelled teeth 54 formed on the shaft 44.

At its end remote from the coupling 46, the shaft 44 is provided with barrelled teeth 56 which constitute the driving element of an engageable and disengageable gear-type articulated coupling 58, the driven element of which is constituted by an internal gear 60 which is formed within a driving sleeve 62 carried by a roll shaft 64. The driving sleeve 62 is provided with a "bell-mouth" or funnel-shaped portion 66, and the end of the torque-transmitting shaft adjoining the teeth 56 is provided with a tapered portion 68 to facilitate its entry into said sleeve. An oil-seal 80, which is shown diagrammatically in the drawings, is associated with the shaft 44 so that, when the coupling 58 has been engaged, a seal is formed at the "bell-mouth" portion of the sleeve so that said coupling can be charged with grease to reduce the wear which inevitably takes place due to the constant "scuffing" action which occurs at the teeth 56 when the roll and drive shaft therefor are out of alignment.

An extension piece 70 which is formed on the extreme end of the shaft 44 abuts against the end of the roll shaft when the driving and driven elements of the coupling 58 have been brought into driving engagement, and resilient means are provided which maintain said extension piece in abutment with the end of said roll shaft when the rolls are in operative position. Said resilient means comprise a plunger 72 which is slidably accommodated in a bore 74 formed in the end of the shaft 44 remote from said spigot, said plunger being acted upon by a powerful spring 76 so as to be urged into abutment with the end of the shaft 52. An annular retaining ring 78, which is secured on the end of the driving sleeve 50, serves as an abutment member for the teeth 54 and prevents the driving and driven elements of the coupling 46 being forced out of engagement with each other when a mill is withdrawn for replacement by a standby mill.

When a mill is withdrawn and the couplings 58 are thus disengaged, the torque-transmitting shafts 44 settle upon respective supports 82, the height of which thus determines the maximum misalignment of the shafts.

The maximum misalignment of the shafts which must be catered for is of course dependent upon the maximum center distance between the pairs of rolls to which they are to be connected. Frequently, therefore, since the pairs of rolls which are mounted on a standby mill may be set at a center distance at or approaching the minimum, the lowermost barrelled teeth 56 of a shaft resting on a support 82 are disposed at a lower level than the other diameter of the "bell-mouth" portion 66 of the driving sleeve into which the shaft has to slide, as can be seen in FIG. 3. It will, of course, be realized that the width of the bell-mouth portion is limited by the driving connection being as large and as robust as possible and the rolls being capable of being closely spaced. However, the tapered end portion of the torque-transmitting shaft facilitates its entry into the "bell-mouth" portion in these circumstances.

When a standby rolling mill is being brought into use, it is moved slowly into place along the rails 20 as previously described and the torque-transmitting shafts 44, which meanwhile rest upon their respective supports 82, are driven slowly by their respective pinions or are "nudged" around as the "bell-mouth" portions of the driving sleeves 62 contact the ends of said shafts. The shafts thus climb into said sleeves, and if the barrelled teeth 56 do not immediately fall into mesh with the gears 60 which are formed within said sleeves, the springs 76 give somewhat until meshing takes place. Movement of the mill then continues until the rolls are disposed in the desired position, by which time the extension pieces 70 have come into abutment with the ends of respective roll shafts and the springs 76 have been subjected to somewhat greater compression.

Thus it will be seen that standby mills having their rolls disposed at various center distances can be brought into use with equal facility without the necessity for the torque-transmitting shafts to be moved into appropriate positions before the rolls can be drivably coupled to the pinions for driving them.

Various modifications may be made without departing from the scope of the invention. For example, the permanent driving connection at one end of each torque-transmitting shaft may be of any type and need not be constituted by a gear-type coupling. Furthermore, it will be understood that the means for moving the roll housings along the rails forms no part of the present invention.

What we claim is:

1. An engageable and disengageable articulated torque-transmitting connection for drivably coupling a rolling mill roll to a pinion for driving said roll, said connection comprising a torque-transmitting shaft; a gear-type articulable coupling at one end of said shaft forming a permanent driving connection with said pinion; barrelled teeth formed adjacent the other end of said shaft and constituting a driving element of an engageable and disengageable gear-type articulable coupling, a driving sleeve carried by the roll; an internal gear formed within said driving sleeve and constituting a driven element of the engageable and disengageable gear-type articulable coupling; a "bell-mouth" portion formed at an open end of the driving sleeve; a tapered end portion formed on the shaft for cooperation with said "bell-mouth" portion so as to facilitate the entry of the driving element of the engageable and disengageable coupling into the driving sleeve thereof from a position in which the lowermost barrelled teeth are disposed at a lower level than the outer diameter of the "bell-mouth" portion; and a spring within the gear-type articulable coupling forming the permanent driving connection, said spring acting to maintain the barrelled teeth of the engageable and disengageable coupling in engagement with the internal gear of the driving sleeve when a driving connection been established.

2. An engageable and disengageable articulated torque-transmitting connection for drivably coupling a rolling mill roll to a pinion for driving said roll, said connection comprising a torque-transmitting shaft; a gear-type articulable coupling at one end of said shaft forming a permanent driving connection with said pinion; barrelled teeth formed adjacent the other end of said shaft and constituting a driving element of an engageable and disengageable gear-type articulable coupling; a driving sleeve carried by the roll; an internal gear formed within said driving sleeve and constituting a driven element of the engageable and disengageable gear-type articulable coupling; a "bell-mouth" portion formed at an open end of the driving sleeve; a tapered end portion formed on the shaft for cooperation with said "bell-mouth" portion so as to facilitate the entry of the driving element of the engageable and disengageable coupling into the driving sleeve thereof from a position in which the lowermost barrelled teeth are disposed at a lower level than the outer diameter of the "bell-mouth" portion; a spring within the gear-type articulable coupling forming the permanent driving connection, said spring acting to maintain the barrelled teeth of the engageable and disengageable coupling in engagement with the internal gear of the driving sleeve when a driving connection has been established; and means for supporting the torque-transmitting shaft when the roll is moved axially to effect disengagement of the driving and driven elements of the engageable and disengageable articulable coupling.

References Cited by the Examiner
UNITED STATES PATENTS

| | | | |
|---|---|---|---|
| 1,872,039 | 8/1932 | James | 64—8 X |
| 2,679,734 | 6/1954 | Morey | 64—9 |
| 2,697,335 | 12/1954 | Peterson | 64—8 |
| 2,845,781 | 8/1958 | O'Brien | 64—8 X |
| 2,906,106 | 9/1959 | Haas | 64—9 |
| 2,922,294 | 1/1960 | Wildhaber | 64—9 |
| 3,044,280 | 7/1962 | Haneklaus | 64—8 |
| 3,126,722 | 3/1964 | Kramer et al. | 64—8 |

FRED C. MATTERN, Jr., *Primary Examiner.*

HALL C. COE, *Assistant Examiner.*